(12) United States Patent
Blaszczykiewicz

(10) Patent No.: US 12,496,795 B2
(45) Date of Patent: *Dec. 16, 2025

(54) COMPOSITE TOOLING ASSEMBLY

(71) Applicant: Innex Innovative Industries, Rochester, NY (US)

(72) Inventor: Thomas Blaszczykiewicz, Rochester, NY (US)

(73) Assignee: Innex Innovative Industries, Rochester, NY (US)

( * ) Notice: Subject to any disclaimer, the term of this patent is extended or adjusted under 35 U.S.C. 154(b) by 770 days.

This patent is subject to a terminal disclaimer.

(21) Appl. No.: 17/714,108

(22) Filed: Apr. 5, 2022

(65) Prior Publication Data

US 2022/0297403 A1 Sep. 22, 2022

Related U.S. Application Data

(63) Continuation-in-part of application No. 16/832,316, filed on Mar. 27, 2020, now Pat. No. 11,958,262, which is a continuation-in-part of application No. 16/712,082, filed on Dec. 12, 2019, now Pat. No. 11,225,704.

(60) Provisional application No. 63/216,067, filed on Jun. 29, 2021, provisional application No. 63/171,014, filed on Apr. 5, 2021, provisional application No. 62/825,094, filed on Mar. 28, 2019.

(51) Int. Cl.
*B30B 15/06* (2006.01)
*B30B 11/02* (2006.01)

(52) U.S. Cl.
CPC ............ *B30B 15/065* (2013.01); *B30B 11/02* (2013.01)

(58) Field of Classification Search
CPC .......... B30B 15/056; B30B 11/02; A61J 3/10; B29C 70/72; B29C 70/74; B29C 70/845
See application file for complete search history.

(56) References Cited

U.S. PATENT DOCUMENTS

| | | | | |
|---|---|---|---|---|
| 2,431,095 | A * | 11/1947 | Tucker | B30B 11/025 419/48 |
| 2,694,245 | A * | 11/1954 | Rogers | C04B 33/13 264/43 |
| 3,502,584 | A | 3/1970 | Denes | |
| 3,639,639 | A | 2/1972 | Mccard | |
| 3,762,919 | A | 10/1973 | Daniels | |
| 3,901,717 | A | 8/1975 | Revaz | |
| 4,052,916 | A * | 10/1977 | Feneberg | B28B 21/76 76/107.1 |
| 4,606,767 | A | 8/1986 | Nagato | |

(Continued)

FOREIGN PATENT DOCUMENTS

| | | |
|---|---|---|
| CN | 201582100 | 9/2010 |
| JP | 2007180289 | 7/2007 |

*Primary Examiner* — Timothy Kennedy
(74) *Attorney, Agent, or Firm* — Brannon Sowers & Cracraft PC; David E. Novak

(57) ABSTRACT

A tooling assembly, including an elongated ceramic member having a distal end and an oppositely disposed proximal end, a plurality of spaced protuberances extending from the elongated proximal end, at least one groove formed in the proximal end, and an elongated polymer member enveloping the distal end. The overlap of the elongated polymer member and the elongated ceramic member defines a joint. The joint has a tensile strength of at least 11121 Newtons.

12 Claims, 4 Drawing Sheets

(56) References Cited

U.S. PATENT DOCUMENTS

| | | | | |
|---|---|---|---|---|
| 4,614,453 A | * | 9/1986 | Tsuno | F16B 4/00 403/30 |
| 4,614,630 A | * | 9/1986 | Pluim, Jr. | B29C 45/37 264/328.2 |
| 4,624,884 A | | 11/1986 | Harada | |
| 4,719,074 A | * | 1/1988 | Tsuno | F01D 5/025 419/13 |
| 4,898,699 A | | 2/1990 | Hofmann | |
| 4,955,953 A | | 9/1990 | Kayser | |
| 5,006,392 A | * | 4/1991 | Sakamoto | C04B 41/83 428/137 |
| 5,090,500 A | | 2/1992 | Yousef | |
| 5,186,854 A | | 2/1993 | Edelstein | |
| 5,624,542 A | | 4/1997 | Shen | |
| 5,708,956 A | | 1/1998 | Dunmead | |
| 5,985,461 A | | 11/1999 | Tani | |
| 5,993,511 A | | 11/1999 | Piro | |
| 6,245,439 B1 | | 6/2001 | Yamada | |
| 6,982,378 B2 | | 1/2006 | Dickson | |
| 7,030,828 B2 | | 4/2006 | Kato | |
| 7,033,156 B2 | * | 4/2006 | Gakovic | B30B 15/065 425/444 |
| 7,214,046 B2 | | 5/2007 | Gakovic | |
| 7,276,202 B2 | * | 10/2007 | Choi | B28B 1/26 264/610 |
| 7,485,366 B2 | | 2/2009 | Ma | |
| 7,740,814 B2 | | 6/2010 | Westin | |
| 7,913,369 B2 | * | 3/2011 | Gakovic | B30B 15/065 29/402.09 |
| 8,312,612 B2 | * | 11/2012 | Gakovic | B30B 15/065 29/445 |
| 11,225,704 B2 | | 1/2022 | Blaszczykiewicz | |
| 2003/0050707 A1 | | 3/2003 | Landingham | |
| 2005/0072269 A1 | | 4/2005 | Banerjee | |
| 2005/0236407 A1 | | 10/2005 | Aisenbrey | |
| 2007/0205529 A1 | | 9/2007 | May | |
| 2010/0038142 A1 | | 2/2010 | Snyder | |
| 2014/0162864 A1 | | 6/2014 | Hall | |

* cited by examiner

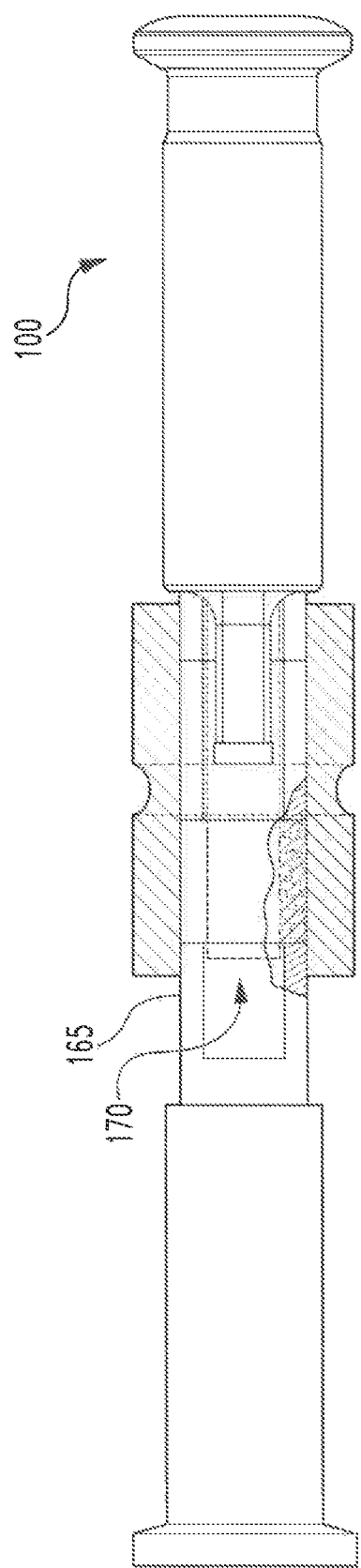

COMPOSITE TOOLING ASSEMBLY

CROSS-REFERENCE TO RELATED APPLICATIONS

This patent application claims priority to U.S. provisional patent application Ser. No. 63/171,014, filed on Apr. 5, 2021, and to U.S. provisional patent application Ser. No. 63/216,067, filed on Jun. 29, 2021; and is also a continuation-in part of U.S. patent application Ser. No. 16/832,316, filed on Mar. 27, 2020, which claimed priority to then U.S. provisional patent application Ser. No. 62/825,094, filed on Mar. 28, 2019, and to is a continuation-in-part of, and claims priority to, co-pending U.S. patent application Ser. No. 16/72,082, filed on Dec. 12, 2019.

TECHNICAL FIELD

The novel technology disclosed herein relates generally to the field of tooling and, more particularly, to a polymer/ceramic composite material tooling body.

BACKGROUND

Tooling involved in the compaction of powders to yield compressed or 'green' bodes is typically metallic, such as a three piece housing/sleeve/mandrel assembly. Sometimes, the assembly includes a ceramic punch tip and/or sleeve, as ceramic materials have superior compressive properties. However, the ceramic components are inherently brittle, tend to chip, and the steel/ceramic joint tends to be a weak point for force transfer. Metallic tooling tends to creep and/or bend over time with use, and when the mandrel wears and needs to be replaced, such creep/bending must be corrected. Such reshaping of the steel tooling introduced strain hardening, which may be mitigated by a heat annealing step, adding time and expense to the refurbishing process.

Further, in the case of cermet tooling, replacement of a ceramic rod or punch requires using EDM or like techniques to burn a hole through the steel housing for attachment of the ceramic rod portion to the steel rod or housing such that the ceramic portion does not pivot, spin, or twist relative to the steel portion. Such EDM machining progressively weakens the steel housing each time the ceramic rod/tip portion is replaced. As such replacements are frequent, the steel housing thus has a finite life, shortened by each replacement.

Finally, sending worn steel tooling off for refurbishing adds time and expense to the user, as steel tooling is relatively heavy, costly to ship, and time consuming to refurbish.

Thus, there remains a need for compaction tooling that may take advantage of the compressive properties of a ceramic punch without the attendant drawbacks of connection of the same to steel rods. The present novel technology addresses this need.

BRIEF DESCRIPTION OF THE DRAWINGS

FIG. 4C is an exploded view of the punch of FIG. 4A cooperating with a die.

DETAILED DESCRIPTION

Figure 1:
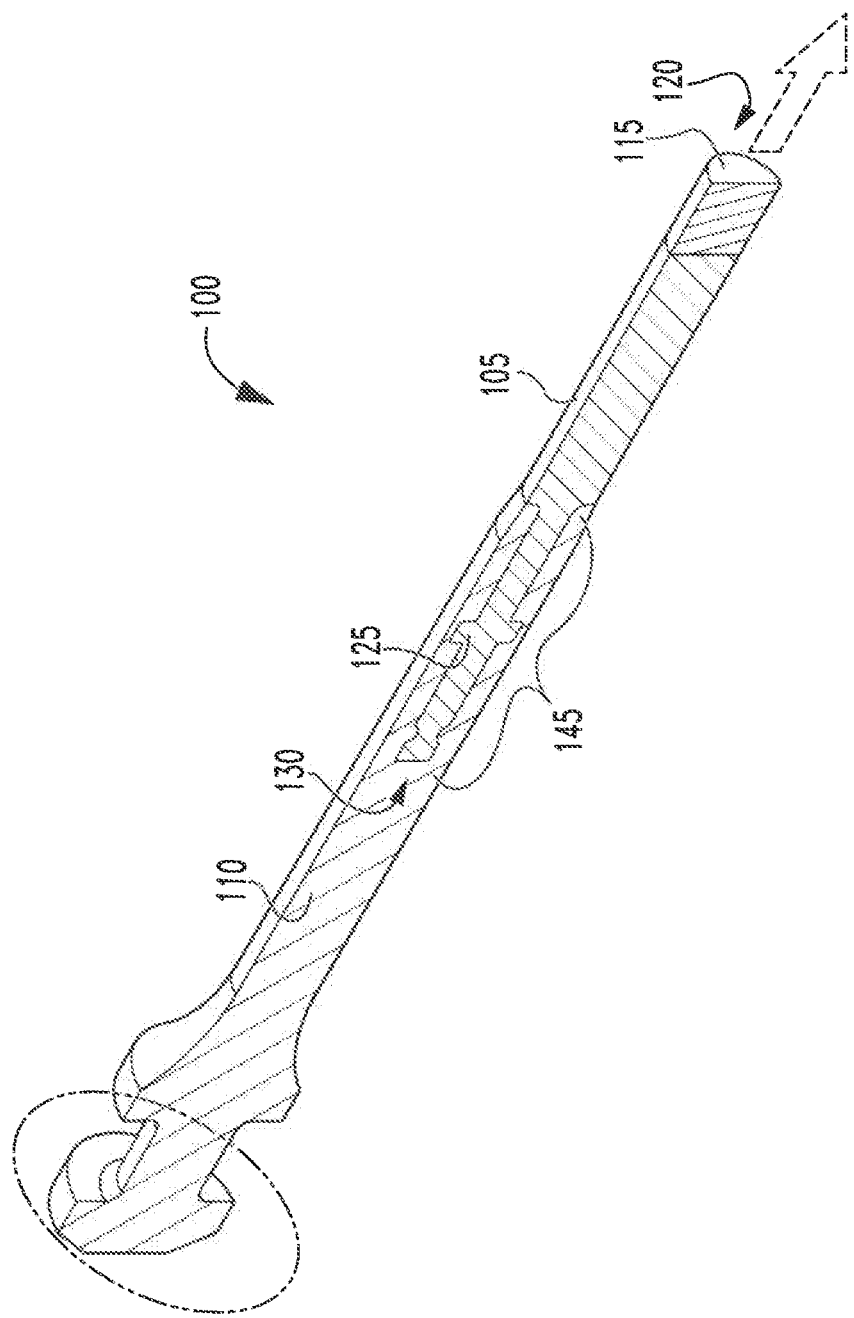
FIG. 1 is a perspective cutaway view of a composite rod assembly according to a first embodiment of the present novel technology.
Figure 2A:
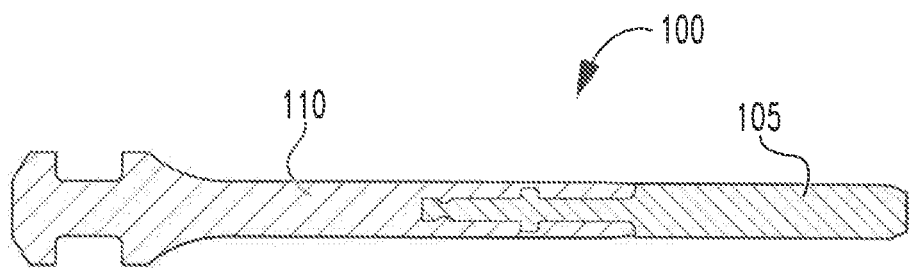
FIG. 2A is a side cutaway view of the embodiment of FIG. 1 with protuberances oriented with 120 degree separation.
Figure 2B:
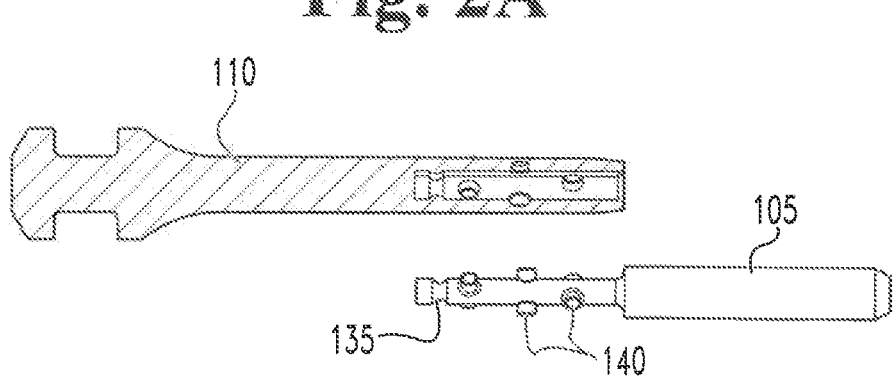
FIG. 2B is an exploded view of FIG. 2A.
Figure 3A:
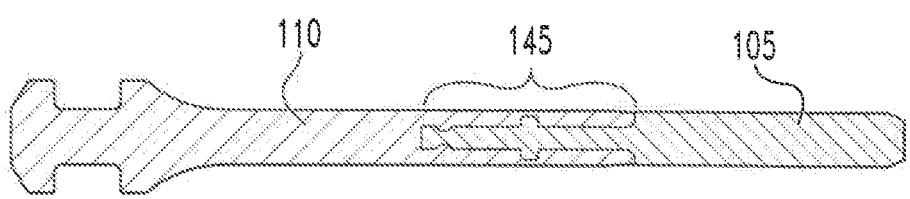
FIG. 3A is a side cutaway view of the embodiment of FIG. 1 with protuberances oriented with 90 degree separation.
Figure 3B:
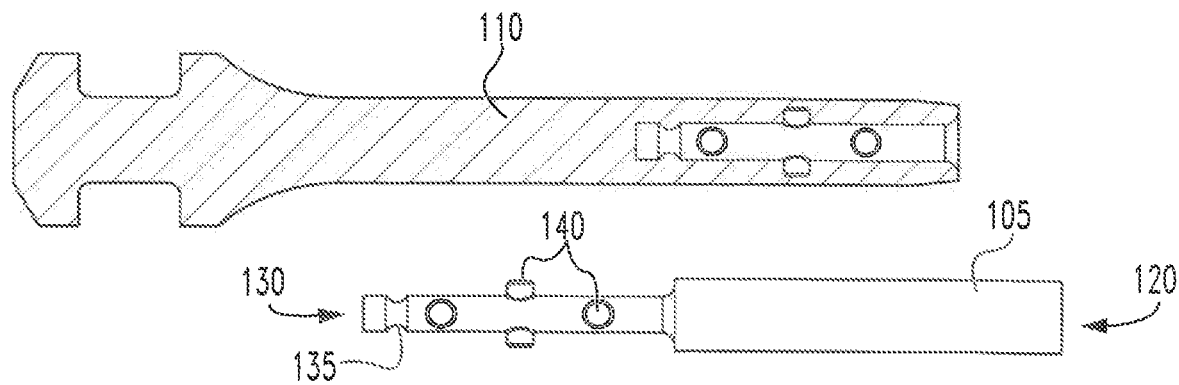
FIG. 3B is an exploded view of FIG. 2A.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

As illustrated in FIGS. 1-3B, the present novel technology relates to compressive tooling assembly 100 utilizing a ceramic or cermet punch or rod portion 105 having a composition that may be formed into sintered and densified ceramic bodies that enjoy the physical toughness, strength and wear resistance of ceramics while connected to a nonmetallic base rod, housing, or sleeve portion 110. The rod/housing/sleeve portion no of the compaction tool are typically polymer composite materials, such as a carbon fiber reinforced high-strength polymers, such as PEEK-polyetheretherketone, PBI, polybenzimadazole, polyamide-imide (PAT), thermoplastics, urethanes, and the like, as well as composites containing carbon fiber, glass fiber, SiC whiskers, soft ferrites, Mu metal, manganese ferrite, TiN, graphene, silver and the like. These cermet rod portion 105 is over-molded by polymer composite material portion no so as to yield a punch assembly 100 having a ceramic rod/punch tip portion 105 connected to a polymer composite base rod portion no.

The ceramic, cermet or ceramic composite rod and punch tip portion 105 has a ceramic punch tip 115 at a distal end 120 and a contoured connection portion 125 at or near an oppositely disposed proximal end 130. The contoured portion 125 includes one or more grooves or recesses 135 formed therein for filling with polymer overmold material to securely connect the rod portions 105, 110, and also a plurality of spaced protuberances 140 extending therefrom for preventing rotational movement of each portion 1105, no relative to the other 110, 105.

Typically, the ceramic portion 105 is a structural ceramic, such as alumina, mullite, zirconia, yttria stabilized zirconia (YSZ), combinations therefor, or the like. The ceramic portion is formed, such as by any convenient ceramic processing means, sintered, and fired. The grooves and protuberances 135, 140 may be formed in situ, or may be machined into the green/sintered/fired ceramic rod 105.

Once the ceramic rod portion 105 is prepared, the polymer rod portion no is formed by overmolding the proximal end 130 with polymer/polymer composite material to form the polymer rod portion 110. The grooves 135 are filled in with polymer material and the protuberances are embedded in the same, yielding a joint 145 locking the two rod portions 105, no together. The joint 145 will typically withstand at least 2500 pounds (11121 Newtons) tensile force, more typically at least 3500 pounds (15569 Newtons) tensile force, and still more typically at least 5000 pounds (22242 Newtons) tensile force. The pressure molding process is typically automatic and takes about 20 seconds to complete.

The polymer portion no is typically made of a high-strength polymer material, such as high molecular mass polymers, thermoplastics, thermosetting polymers, amorphous plastics, crystalline plastics, resin-based materials, combinations thereof, and the like. The polymer portion 110 may be reinforced with a plurality of reinforcing particles dispersed therein. The reinforcing particles may be selected from the group comprising glass, carbon nanotubes, carbon fiber, graphite, graphene, ceramic powder, and combinations thereof.

In some embodiments, the polymer/polymer composite portion includes a colorant, so that different parts may be color coded for ease of differentiation and identification.

In some embodiments, the ceramic/cermet portion 105 and/or the polymer portion 110 include a metallic phase such as Ni, Fe, Co, permalloy, Mu-metal, and combinations thereof, dispersed therein. The metallic phase may be introduced in oxide form for reduction to metallic form during processing, to avoid mixing issues arising from significant density differences as well as metallic species chemically interacting with oxide species at elevated temperatures. Alternately, some or all of the metallic phase component may be introduced as metallic species. The metallic phase may be an alloy, and the alloy may be introduced as metal alloy particles, particles of oxidized alloy, or as oxides of the constituent metals for reduction and subsequent alloying of the resulting metals. The metallic phase typically has a high magnetic permeability $\mu$ of at least about $1\times10^{-4}$ H/m, more typically $\mu$ being at least about $1\times10^{-3}$ H/m, still more typically $\mu$ being at least about $1\times10^{-2}$ H/m, and yet more typically $\mu$ being about $5\times10^{-2}$ H/m. The metallic phase typically has a relative permeability $\mu/\mu_0$ of at least about 100, more typically at least about woo, still more typically of at least about 10,000, and yet more typically of at least about 20,000, and in some cases, $\mu/\mu_0$ may exceed 50,000 or more.

In some specific examples, the metallic phase typically has a high magnetic permeability $\mu$ of at least about $1\times10^{-4}$ H/m with a relative permeability $\mu/\mu_0$ of at least about 100, more typically $\mu$ being at least about $5\times10^{-3}$ H/m and $\mu/\mu_0$ at least about 4000, still more typically $\mu$ being at least about $1\times10^{-2}$ H/m and $\mu/\mu_0$ at least about 8000, and yet more typically $\mu$ being about $2.5\times10^{-2}$ H/m and $\mu/\mu_0$ 20,000. In some cases, $\mu/\mu_0$ may exceed 50,000 or more.

In one embodiment, the sintered, densified composite rods 100 are formed as pill-making tooling. The pill-making tooling enjoys the benefits of ceramic composition, including compression strength, toughness, durability, corrosion resistance, low coefficient of friction, low thermal expansion coefficient, and the like. The tooling enjoys the advantages of the advanced ceramic with the additional ability of being lightweight due to the polymer portion 110. Optionally, the rods 100 may be identified by conventional metal detection technology.

Other embodiments of the sintered, densified composite tooling 100 include equipment and tooling for the processing of foods and beverages, for pharmaceutical manufacture and processing, battery preparation, medical diagnostic devices and tools, military hardware, weapons, metal blades and cutting tools, industrial tooling and machinery, punches and dies, and the like.

In operation, tooling 100 made from the novel composite material functions similarly to traditional metal tooling, with the exception of typically requiring less lubricant and maintenance and having more flexibility in the base rod portion 110. This is advantageous for tooling associated with the production of pharmaceuticals and foodstuffs, such as pills, vitamins, and the like, as there is an associated reduction of discoloration (i.e., black marks) of the final product. Further, the novel composite tooling 100 is typically formed as a single piece, as contrasted to traditional multipiece tooling (i.e., metal punch having a ceramic tip), and thus the incidence of attached tooling pieces becoming dislodged during use is eliminated.

In some embodiments, a production line utilizing the novel composite tooling 100 will have metal detectors for detecting and screening tooling chips from product. Typically, metal detectors employ an electric generator for producing an alternating electric field and a magnetometer for detecting magnetic fields. The electric generator produces an alternating electric field which generates eddy currents in electrically conductive materials; the eddy currents give rise to magnetic fields, which may be detected by the magnetometer. The tooling chip contaminants contain electrically conductive metallic particles which react to the magnetometer. Chips are thus removed from product upon detection. In some embodiments, the novel cermet material is sufficiently ferromagnetic as to be magnetically sortable from nonmagnetic product. Further, the novel cermet is advantageous in that, with the proper selection of alloy having high magnetic permeability, it has an ability to be detected at smaller sized particles than ferrous tool steel. For the given magnetic permeabilities of this material, as discussed above, tooling chips having diameters of 0.5 mm may be typically detected and magnetically or otherwise removed, and more typically chips having diameters of 0.3 mm may be detected and magnetically or otherwise removed.

Moreover, the ceramic/cermet portion 105 is substantially harder and tougher than tool steel. In some embodiments, soft ferrite is used as a stabilizer, supplementing or replacing magnesia, yttria, or like compositions with soft ferrite and/or permalloy. This can be added to materials such as alumina, mullite, ZTA, or the like and toughen up the material and provide a low cost hard material with enhanced toughness. Likewise, SiC, graphite, or like other fibers and/or whiskers may be added to the polymer portion no to provide additional toughness and strength.

Thus the novel rod 100 allows for possible abrasion resistance of up to 4 to 5 times what is allowed by typical tool steel.

The following example is merely representative of the work that contributes to the teaching of the present novel article, and the novel material is not intended to be restricted by the following example.

Figure 4A:
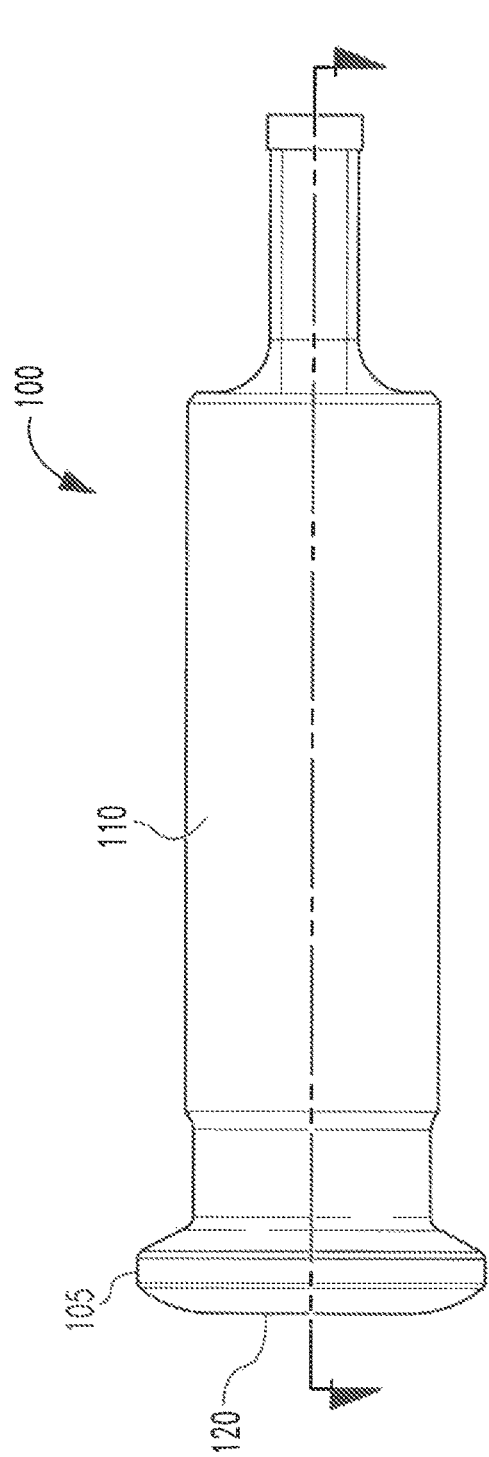
FIG. 4A is a side elevation view of a punch having head and tip portions overmolded with a plastic central body portion.
Figure 4B:
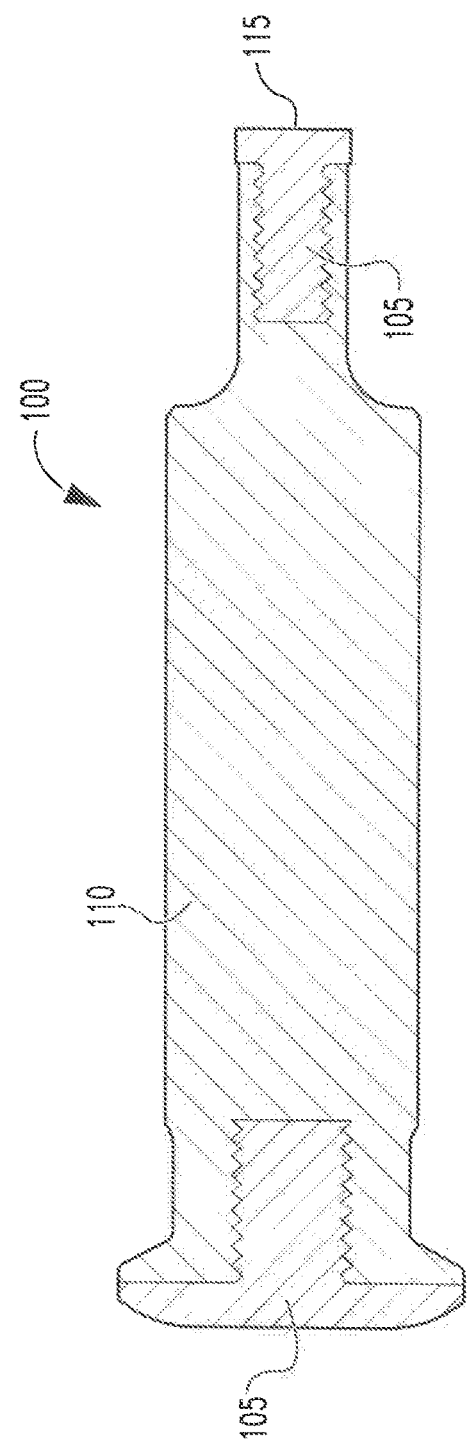
FIG. 4B is a cutaway view of FIG. 4A.

In one embodiment, as shown in FIGS. 4A-4C, the tooling 100 is a compaction punch for use in a die 165 for producing battery bodies. The die 165 maybe made of steel, ceramic, cermet composite material, or any convenient structural material. The die 165 is a generally hollow cylindrical member sized to cooperate with the punch 100 to compress powder positioned in the die cavity 170 into a green body pill or tablet.

In operation, the compaction rod 100 is utilized on a tablet press. The die is filled with powdered battery material and the punch 100 is engaged to tamp the powder in the die 165 to yield a green body, after which the punch 100 is removed from the die 165 and the green body tablet is ejected from the compaction die 165. The parameters of this process are varied (fine-tuned) depending on the equipment and desired finished product.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:

1. A tooling assembly, comprising:
an elongated ceramic member having a distal end and an oppositely disposed proximal end;
a plurality of spaced protuberances extending from the elongated proximal end;
at least one groove formed in the proximal end;
an elongated polymer member enveloping the distal end;
wherein overlap of the elongated polymer member and the elongated ceramic member defines a joint;
wherein the tooling assembly is a punch in a rig for manufacturing batteries.

2. The tooling assembly of claim 1 wherein the joint has a tensile strength of at least 11121 Newtons.

3. The tooling assembly of claim 1 wherein the joint has a tensile strength of at least 15569 Newtons.

4. The tooling assembly of claim 1 wherein the joint has a tensile strength of at least 22242 Newtons.

5. The tooling assembly of claim 1 and further comprising a ceramic tip on the distal end.

6. The tooling assembly of claim 1 wherein the elongated polymer member is selected from the group consisting of high molecular mass polymers, thermoplastics, thermosetting polymers, amorphous plastics, crystalline plastics, resin-based materials, and combinations thereof.

7. The tooling assembly of claim 6 wherein the elongated polymer member includes dispersed particulates selected from the group consisting of glass, carbon nanotubes, carbon fiber, graphite, graphene, ceramic powder, and combinations thereof.

8. The tooling assembly of claim 1 wherein the elongated ceramic member is selected from the group consisting of alumina, mullite, zirconia, yttria stabilized zirconia (YSZ), and combinations thereof.

9. The tooling assembly of claim 1 wherein the elongated ceramic member is a cermet.

10. The tooling assembly of claim 1 wherein at least one respective elongated member further comprises a plurality of metallic particles dispersed therein; wherein the metallic particles are selected from the group consisting of Ni, Fe, Co, permalloy, Mu-metal, and combinations thereof; and wherein the at least one respective elongated member has a high magnetic permeability $\mu$ of at least about $2.5 \times 10^{-2}$ H/m with a relative permeability $\mu/\mu 0$ of at least about 20000.

11. A punch and die assembly for producing battery discs, comprising:
a punch portion, further comprising:
an elongated ceramic member having a distal end and an oppositely disposed proximal end;
a plurality of spaced protuberances extending from the elongated proximal end;
at least one groove formed in the proximal end;
an elongated polymer member enveloping the distal end;
wherein overlap of the elongated polymer member and the elongated ceramic member defines a joint; and
a generally hollow cylindrical die portion sized to cooperate with the punch portion.

12. The punch and die assembly of claim 11, wherein the die is partially filled with powdered battery material.

* * * * *